Figure 1:
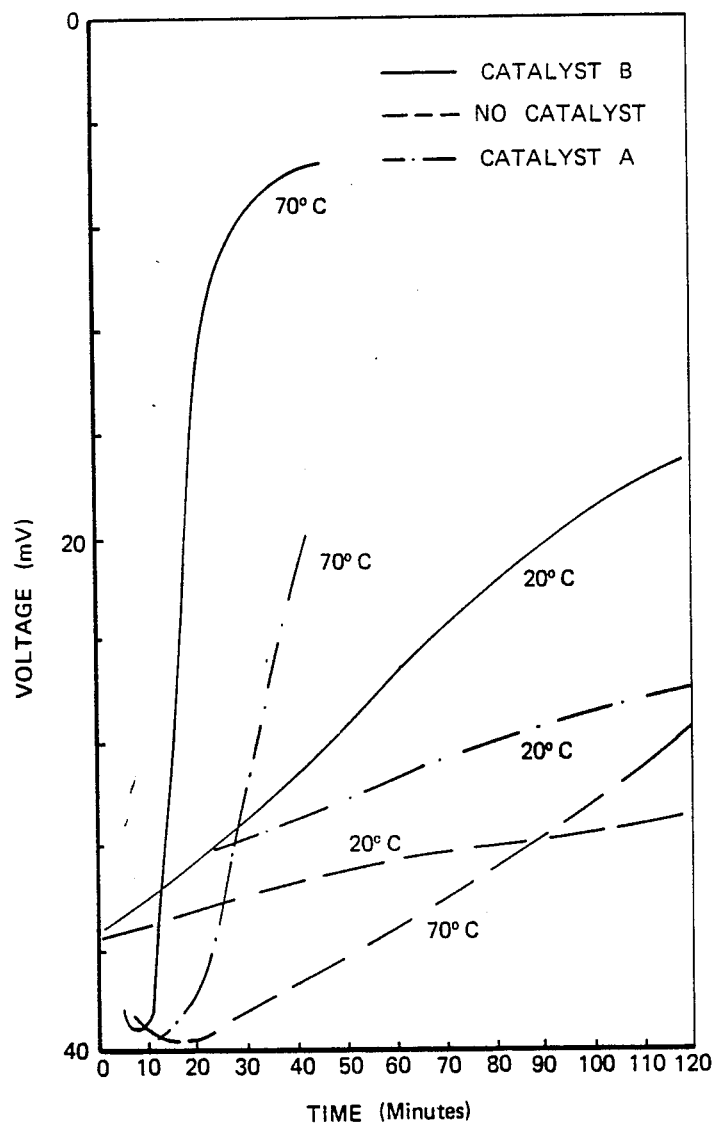

United States Patent [19]

Scott et al.

[11] Patent Number: 4,954,472
[45] Date of Patent: Sep. 4, 1990

[54] TEMPERATURE ACTIVATED CATALYSTS FOR LIQUID POLYMER CURES

[75] Inventors: Keith W. Scott, Shrewsbury; Bryan G. Willoughby, Telford, both of England

[73] Assignee: Rapra Technology Limited, Shrewsbury, England

[21] Appl. No.: 282,038

[22] Filed: Dec. 9, 1988

[30] Foreign Application Priority Data

Dec. 12, 1987 [GB] United Kingdom ............... 8729069

[51] Int. Cl.$^5$ .............................................. B01J 31/12
[52] U.S. Cl. ..................................... 502/152; 502/159
[58] Field of Search .............................. 502/152, 159

[56] References Cited

U.S. PATENT DOCUMENTS

| | | | |
|---|---|---|---|
| 3,136,731 | 6/1964 | Piechota et al. | 260/2.5 |
| 4,087,412 | 5/1978 | Groves | 502/152 X |
| 4,230,633 | 10/1980 | Vollhardt et al. | 502/159 X |
| 4,287,307 | 9/1981 | Hostettler | 502/152 X |
| 4,361,497 | 11/1982 | Boldt et al. | 502/159 |
| 4,507,410 | 3/1985 | Falardeau et al. | 502/152 X |
| 4,632,912 | 12/1986 | Bedell et al. | 502/159 X |
| 4,714,691 | 12/1987 | Goins et al. | 502/159 X |
| 4,753,911 | 6/1988 | Goe et al. | 502/159 |
| 4,753,992 | 6/1988 | Umpleby | 535/100 |

FOREIGN PATENT DOCUMENTS

| | | |
|---|---|---|
| 8409 | 3/1980 | European Pat. Off. . |
| 133779 | 3/1985 | European Pat. Off. . |
| 152209 | 6/1985 | European Pat. Off. . |
| 165799 | 12/1985 | European Pat. Off. . |
| 2068975 | 8/1981 | United Kingdom . |
| 2087908 | 6/1982 | United Kingdom . |

OTHER PUBLICATIONS

Chemical Abstract 85:6946q.

*Primary Examiner*—Patrick P. Garvin
*Attorney, Agent, or Firm*—Dennison, Meserole, Pollack & Scheiner

[57] ABSTRACT

A temperature-activated catalyst for polyurethane or liquid polymer cures comprising the catalyst supported on, e.g. mounted on or bound into, a polymer which is incompatible with, viz. insoluble in, the reacting polymer phase.

The catalyst may contain organotin groupings and the polymer may be mobile or rubber and have a linear polymer backbone, e.g. styrene-allyl alcohol.

The polymer may be glassy and be ground to a fine powder.

19 Claims, 5 Drawing Sheets

VNC TRACES OF THE CURE OF DIOREZ 520 WITH MDI IN THE PRESENCE OF TWO DIFFERENT GLASS CATALYSTS OR IN THE ABSENCE OF CATALYST

VNC TRACES OF THE CURE OF DIOREZ 520 WITH MDI IN THE PRESENCE OF CATALYST C AND IN THE ABSENCE OF CATALYST AT 20°C and 120°C VNC TRACES OF THE CURE OF DIOREZ 520 WITH MDI IN THE PRESENCE OF CATALYST D AND IN THE ABSENCE OF CATALYST AT 20°C and 80°C VNC TRACES OF THE CURE OF DIOREZ 520 WITH MDI IN THE PRESENCE OF CATALYST E AND IN THE ABSENCE OF CATALYST AT 20°C and 80°C

TEMPERATURE ACTIVATED CATALYSTS FOR LIQUID POLYMER CURES

This invention is concerned with temperature activated catalysts and the production of the same. In particular it is concerned with catalysts which control the dependence of reaction rate on temperature in the case of liquid polymer cures and provide the means of doing so over a pre-determined temperature range.

Most of processing reactions of polymers, involving chain extension on crosslinking, are catalysed or activated with appropriate additives. The consequence of the gains in chemical activity is the risk of premature reaction, to the detriment of processibility, prior to a fabrication stage.

One approach to the achievement of appropriate control has been through the use of adducts of suitable curing agents which only release the active component on the application of heat. Examples of these are found in polyurethane technology and include adducts of amines or of isocyanates, sometimes known as "blocked isocyanates." A fundamental disadvantage of these systems is the reversible nature of adduct decomposition which places constraints on the effective release of curing agents, this in turn moderating the rate of cure and the ultimate properties attainable. A further disadvantage is the high temperatures required to effect adduct decomposition, this being most commonly in excess of 100° C. and often in excess of 150° C. Such limitations have restricted the usage of such systems despite the potential benefits of a suppressed cure at the compounding, application or initial fabrication stage. A practical expediency for obtaining some measure of this benefit is to work with lower concentrations of catalyst in the curing formulation, but this has the consequential disadvantage of a reduction in overall cure rate.

We have now found that a marked temperature dependence for polyurethane or liquid polymer cures can be achieved without recourse to chemical adducts of any of the curing agent if the catalyst for the cure is mounted on a polymer which is incompatible with (i.e. insoluble in) the reacting polymer phase. In particular we have found that binding the catalyst into a glassy polymer phase provides catalysis with marked temperature-dependent characteristics. We have also found that with a phase-separated catalyst, high activity is obtained if the catalyst-supporting polymer is mobile or rubbery. The selection of a supporting polymer which has appropriate transition behaviour is therefore an additional option for practical temperature control of the curing reaction.

The exploitation of phase separated glassy catalysts for enhanced temperature control in liquid polymer cures can be illustrated by reference to the following examples. In Example 1 are described the synthesis and application of two catalytic polymers in which organotin groupings are bound to a linear (i.e. uncrosslinked) polymer backbone. Organotin groupings such as these are catalysts for isocyanate/alcohol addition (polyurethane formation) or silanol condensations (liquid silicone cures), the example described here being concerned with polyurethane formation. In this catalytic application the curing agent (polymeric MDI) was incorporated into the formulation immediately after the incorporation of the catalytic polymer. Both these catalytic polymers are glassy at ambient temperature and can be ground to fine powders. When powdered, these glassy products are readily dispersable in polyester or polyether-based polyurethane formulations but do not dissolve owing to the thermodynamic incompatibility of the catalytic polymer with the matrix polymer of the polyurethane formulation. Of the two catalytic polymers described, the triphenyltin derivative has the higher Tg (60° C.) and the higher temperature for the onset of marked activity. By appropriate selection of catalyst the reaction profile can be controlled and, for exothermic cures, an element of delayed-action performance introduced.

The use of the catalysts described in this invention are not confined to polymers which are linear, Example 2 describing the synthesis and application of a crosslinked glassy polymer containing tributyltin alkoxide groups.

The opportunities for controlling reaction profile as offered by this invention provides scope for introducing advantageous processing characteristics to established or otherwise well-characterised systems without the need to resort to alternative processing chemistry or new systems development. The ability to make catalysed reactions which were hitherto the basis for room-temperature vulcanising systems controlled to provide high temperature vulcanisation is a practical example of this. The benefits to be gained include easier handling of fully formulated systems prior to moulding or fabrication.

One major advantage of the pronounced enhancement of cure activity with increasing temperature is in the opportunities for increased room temperature storage stability within a fully formulated composition. Polyurethane catalysts which have been found to be especially useful in this respect are the glassy polymers functionalised with organotin carboxylates.

In Example 3 the catalyst groupings are tributyltin monocarboxylate and in Example 4 the catalyst grouping is a dibutyltin dicarboxylate and is the site of a crosslink. Transition temperatures may be influenced by a variety of factors including backbone type, pendant group type or by the presence of additional components which plasticise. Example 5 shows the influence of a plasticiser within the glassy catalyst. The benefits of storage stability can be retained even when the catalyst is plasticised, Catalyst F showing no detectable ambient temperature activity after 16 hours storage of a polyester-urethane formulation containing this catalyst.

The requirement that the glassy catalyst should be in a dispersed phase places no restraints on the nature and absolute composition of that phase. Thus, for example, the glassy catalyst may be coated on a notionally inert phase such as a mineral powder or glass. Example 6 describes the temperature-activated catalysis of a polyurethane cure by a glassy catalyst coated on calcium carbonate. Such an approach offers substantial scope for economies in materials usage if a large interfacial surface area can be created where the active catalyst species are concentrated at the interface with the matrix polymer.

The substrate supporting the catalyst polymer may be a component of a laminate or composite and may itself be an organic polymer. In Example 7 a thin layer of a glassy catalyst (Catalyst H), coated onto a sheet of polyester terephthalate film (Melinex), was shown to catalyse the 80° C. cure of a P.U. formulation spread onto the treated polyester film. However, no significant activity was observed at room temperature.

Temperature-activated activation of the cure of an unsaturated polyester resin solution in styrene in the presence of a hydroperoxide has also been demonstrated. In Example 8 a glassy polymer (Catalyst I) containing cobalt (II) carboxylate groups was coated onto the fibres of a chopped glass mat. When the mat is treated with the resin formulation described no cure was observed after 1 hour 40 minutes at room temperature. However, cure was achieved within 7 minutes when the composite was placed in an oven at 110° C. A similar sample prepared using untreated chopped glass mat required 30 minutes to cure.

The invention is seen to be widely applicable covering curing formulations which give rubbery or glassy products and which can cure by step—or chain-growth mechanisms. Morevover the invention is not limited to the cures of polymers which have carbon in the backbone: Example 9 describes the temperature-activated catalysis of a silicone polymer cure.

EXAMPLE 1

Poly(styrene-allyl alcohol) 5.7% hydroxyl (20.42 g; 68.1 meq OH) and bis(triphenyltin) oxide (6.07 g 17.0 mmol Sn) were dissolved in dichloromethane (100 cm$^3$). The solvent was then distilled off, final traces of solvent and water (the by-product of the reaction) being removed under reduced pressure of 100° C. The glassy product, designated Catalyst A, contains 7.6% Sn and has a Tg of 60° C. as measured by DSC. The infra-red spectrum of a film of the catalyst cast from dichloromethane showed a reduced absorption around 3400 cm$^{-1}$ (characteristic of OH) compared to that of the starting polymer. This glassy catalyst was easily ground to fine powder.

A second glassy catalyst was synthesised from poly(styrene-allyl alcohol), this time by reaction with bis(tributyltin) oxide, and the reduction in infra-red absorption at around 3400 cm$^{-1}$ was again indicative of reaction at pendant hydroxyl groups. The resulting product contained 6.6% Sn and was designated Catalyst B. The product was glassy, having a Tg as shown by DSC to be around 40° C., and was ground with a fine powder. Both catalysts retain their expected solubility in solvents such as dichloromethane indicating that they retain the linear (i.e. uncrosslinked) character of the starting polymer. These two polymeric catalysts in powder form, have been used to catalyse the cure of a hydroxyl-terminated polyester (Diorez 520, 100 parts) with a polymeric MDI (Bostikure G 15.4 parts) at various temperatures and these cures have been compared with the uncatalysed cure at these temperatures using a Vibrating Needle Curemeter (Rubber World, 1982, 187(3), 26). With this instrument the progress of cure is registered by a voltage change and characteristic times representative of the extent of cure can be obtained from the change in voltage observed: the time $t_{80}$ corresponds to the time when the voltage is 80% that of the change over the whole cure monitored.

Table 1 compares the $t_{80}$ times for each formulation in the presence of Catalysts A and B, tributyltin oleate and also in the absence of catalyst.

TABLE 1

Comparison of a P.U. Cure at Various Temperatures in the Presence or Absence of Organotin Catalysts

| Temperature | $t_{80}$ | | | |
|---|---|---|---|---|
| | With tribuyltin oleate (0.027% Sn.) | With Catalyst A (0.13% Sn.) | With Catalyst B (0.11% Sn.) | No Catalyst |
| 20° C. | 11 mins. | 7.0 hrs. | 2.4 hrs. | 10.4 hrs. |
| 50° C. | 9 mins. | 2.0 hrs. | — | 8.3 hrs. |
| 60° C. | — | 1.1 hrs. | 38 mins. | — |
| 70° C. | 9 mins. | — | 23 mins. | 4.0 hrs. |
| 80° C. | — | 31 mins. | 19 mins. | — |
| 90° C. | — | 20 mins. | 14 mins. | 2.9 hrs. |
| 100° C. | 6 mins. | 15 mins. | 11 mins. | — |
| 110° C. | — | 14 mins. | 11 mins. | — |
| 120° C. | 5 mins. | 10 mins. | 9 mins. | 1.2 hrs. |

FIG. 1 shows the Vibrating Needle Curemeter (VNC) traces for the cures at 20° C. and 70° C. In the traces increasing cure is indicated by an upward displacement on the Y-axis, the X-axis being the time after mixing. These comparisons show that the activities of the two glassy catalysts increase markedly with increasing temperature, and increase more rapidly than that of the conventional catalyst tributyltin oleate.

Of the two glassy catalysts, Catalyst A has the higher glass transition temperature and is the less active at ambient temperature, the resulting cure being only marginally faster than the uncatalysed mix. Catalyst B is the more active at ambient temperature and its activity increases markedly over the temperature range up to 70° C. Catalyst B requires somewhat higher temperatures to achieve comparable activity (e.g. up to 90° C.), but at 120° C., both catalysts have substantially comparable activity.

EXAMPLE 2

A crosslinked glassy catalyst (Catalyst C) was prepared by dissolving poly(styrene-allyl alcohol) containing some pendant tributyltin alkoxide groups (2.0 g) in dichloromethane and adding a polymeric MDI (Isonate 143L; 1.0 g). When, after 2 minutes, the solution had gelled the solvent was allowed to evaporate off in an oven at 80° C. and the glassy product, which contained 5.7% Sn was crushed to a fine powder.

Figure 2:
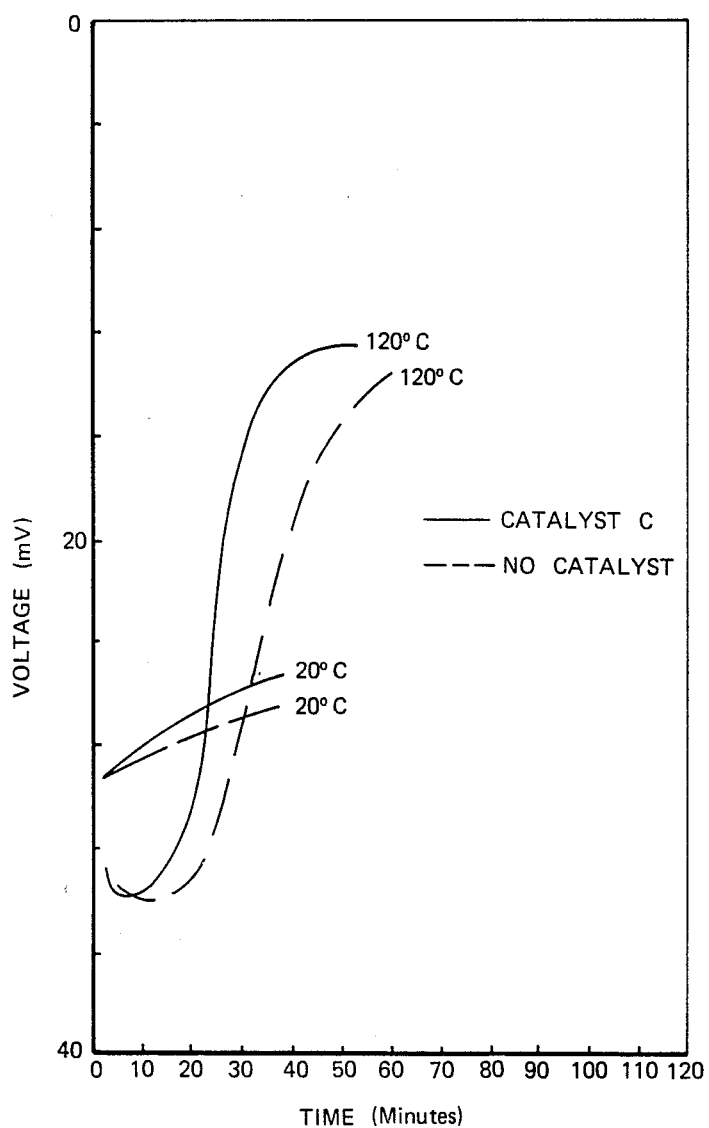

The cure of a hydroxyl-terminated polyester (Diorez 520) with a polymeric MDI (Isonate 143L) at room temperature and 120° C. was conducted both in the presence and the absence of the above catalyst. Table 2 describes the formulations used and FIG. 2 shows the VNC traces of the cures. At 120° C. the catalysed cure is significantly more active than the uncatalysed cure, and the increase in catalytic activity over the range 20°–120° C. is particularly marked.

TABLE 2

Polyurethane Formulations Containing Catalyst C

| Code | Catalyst | % Sn. | Temperature | Diorez 520 | Isonate 143L | Catalyst |
|---|---|---|---|---|---|---|
| SP909 | Catalyst C | 0.02 | 20° C. | 100 parts | 15.4 parts | 0.5 parts |
| SP912 | Catalyst C | 0.02 | 120° C. | 100 parts | 15.4 parts | 0.5 parts |
| SP910 | None | — | 20° C. | 100 parts | 15.4 parts | — |
| SP911 | None | — | 120° C. | 100 parts | 15.4 parts | — |

EXAMPLE 3

A copolymer of methyl methacrylate, butyl methacrylate and methacrylic acid (19.01 g; 44.2 meg. COOH) was reacted with bis(tributyltin) oxide (13.17 g, 44.2 mmole Sn) in a solvent mix of toluene (50 cm³) and 1-methoxypropan-2-ol (50 cm³). The solvents were then distilled off, final traces being removed under vacuum at 100° C. When cool the product (Catalyst D) was a glassy solid which was ground to a fine powder. This glassy polymer, containing 16.4% Sn, showed an absorbance at 1630 cm$^{-1}$ in the infra-red characteristic of carboxylate groups which is not present in the spectra of either of the starting materials.

Figure 3:
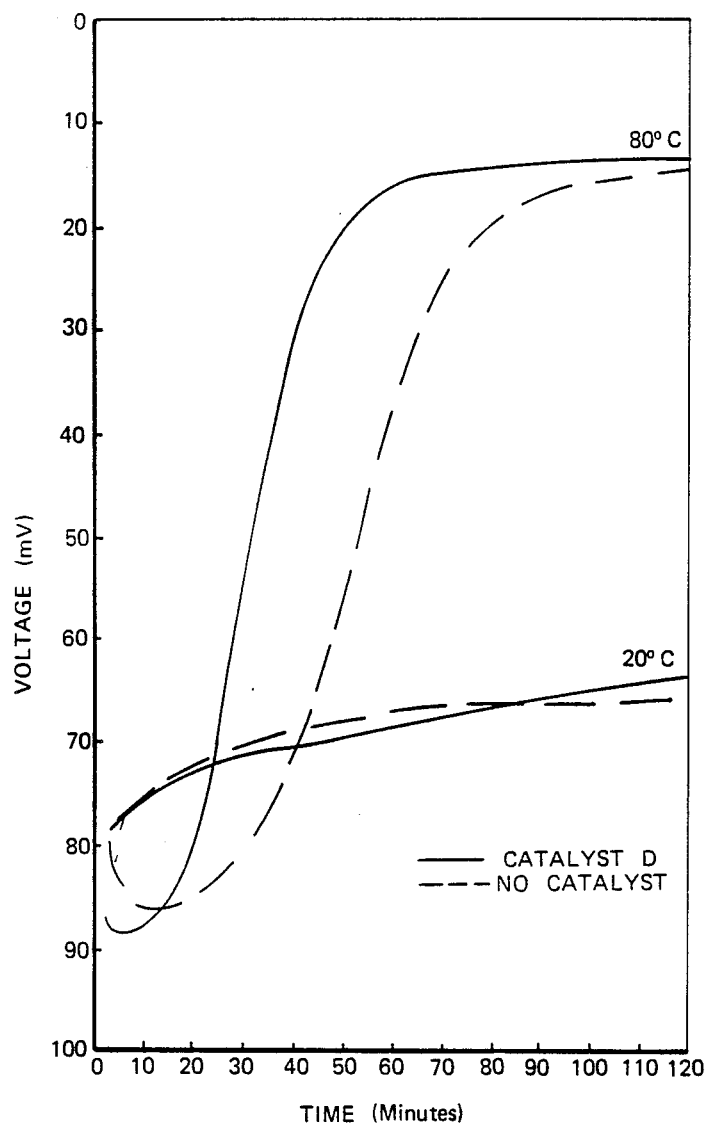

An hydroxyl-terminated polyester (Diorez 520) has been cured with a polymeric MDI (Hyperlast 000) both in the presence and the absence of Catalyst D at room temperature and at 80° C. Table 3 describes the formulations used and the VNC traces in FIG. 3 show the increase in high temperature activity of the glassy catalyst.

TABLE 3

Polyurethane Formulations Containing Catalyst D

| Code | % Sn. | Temperature | Diorez 520 | Hyperlast 000 | Catalyst D |
|---|---|---|---|---|---|
| SP1897 | 0.78% | 20° C. | 100 parts | 15.4 parts | 5.6 parts |
| SP1886 | 0.78% | 80° C. | 100 parts | 15.4 parts | 5.6 parts |
| SP1898 | — | 20° C. | 100 parts | 15.4 parts | — |
| SP1350 | — | 80° C. | 100 parts | 15.4 parts | — |

EXAMPLE 4

The acid-functional acrylic copolymer as used in Example 3 (20.0 g; 46.5 meg. COOH) and dibutyltin oxide (5.79 g; 23.3 mmol.) were heated in a refluxing solvent mixture of toluene (50 cm³) and 1-methoxypropan-2-ol (50 cm³). The solution quickly gelled as the dibutyltin oxide dissolved and, after removal of the solvent by distillation (final traces being removed at 100° C. under reduced pressure) a crosslinked glassy solid was obtained (Catalyst E). The glassy solid, which contains 10.7% Sn, was crushed to a fine powder; the product showing an absorption at 1630 cm$^{-1}$ in the infra-red characteristic of carboxylate groups, not present in the spectra of either of the starting materials.

Figure 4:
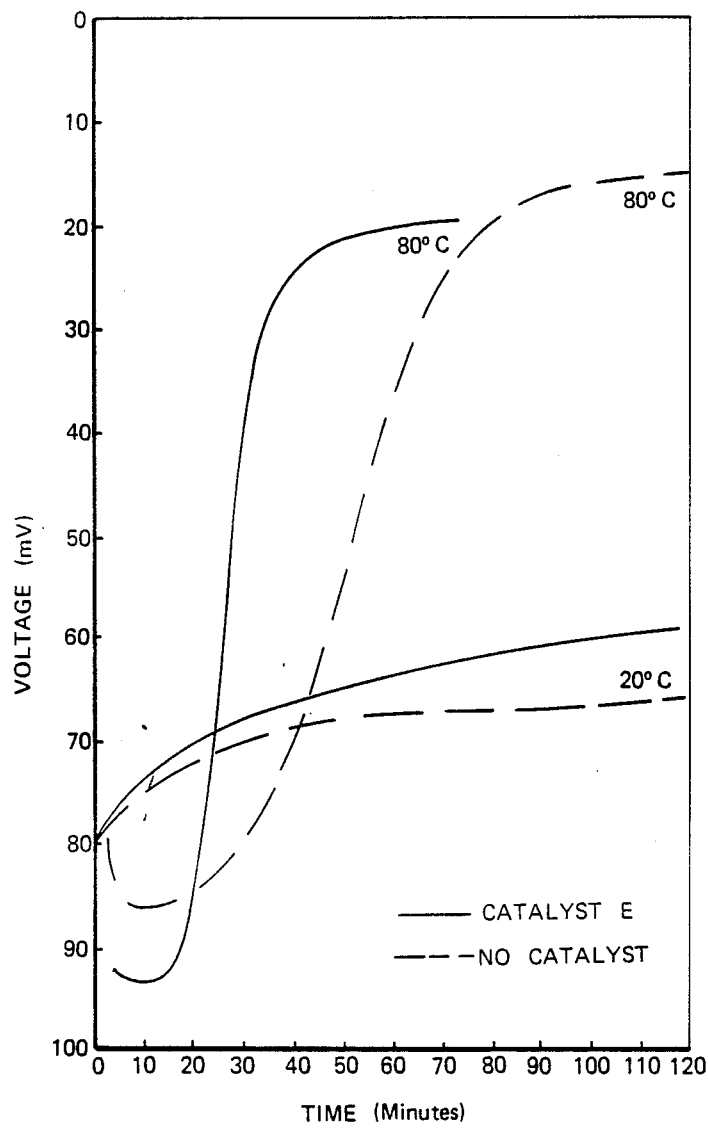

A hydroxyl-terminated polyester (Diorez 520) has been cured with a polymeric MDI (Hyperlast 000) both in the presence and absence of Catalyst E at 80° C. and room temperature. Table 4 describes the cures carried out and shows the VNC traces in FIG. 4 show the increase in high temperature activity of the glassy catalyst.

TABLE 4

Polyurethane Formulations Containing Catalyst E

| Code | % Sn. | Temperature | Diorez 520 | Hyperlast 000 | Catalyst E |
|---|---|---|---|---|---|
| SP1880 | 0.38% | 20° C. | 100 parts | 15.4 parts | 4.2 parts |
| SP1883 | 0.38% | 80° C. | 100 parts | 15.4 parts | 4.2 parts |
| SP1898 | — | 20° C. | 100 parts | 15.4 parts | — |
| SP1350 | — | 80° C. | 100 parts | 15.4 parts | — |

EXAMPLE 5

An acrylic copolymer prepared from 20% methacrylic aCid and 80% methyl methacrylate (22.5 g; 50 meq. COOH) was reacted with dibutyltin oxide (6.22 g; 25 mmol) in the presence of dioctyl phthalate (28.7 g) in refluxing solvents (toluene and 1-methoxypropan-2-ol). When the dibutyltin oxide had dissolved the solvents and low molecular weight by-product (i.e. water) were removed by distillation to leave a glassy solid. This solid, which was easily ground to a fine powder, was found to have a Tg of about 30° C. by DSC. It contained 2.9% Sn and was designated Catalyst F.

Table 5 compares the time for the cure of (Diorez 520), an hydroxyl-terminated polymer, (100 parts) with (Hyperlast 2875/000), a polymeric MDI, (15.4 parts) to reach $t_{80}$, as measured by the VNC, in both the presence and absence of Catalyst F at various temperatures.

TABLE 5

Comprising of a P.U. Cure at Various Temperatures with and without Catalyst F

| | $t_{80}$ | |
|---|---|---|
| Temperature | With Catalyst F (0.06% Sn) | No Catalyst |
| 70° C. | 90 min | — |
| 80° C. | 25 min | 73 min |
| 90° C. | 18 min | 40 min |
| 100° C. | 14 min | 20.5 min |
| 120° C. | 9 min | 9.5 min |

This catalyst shows great potential as a thermally-activated catalyst. The onset of action in this cure seems particularly sharp, $t_{80}$ being only 25 minutes at 80° C., yet 90 minutes at 70° C. Moreover, this glassy catalyst, also holds promise for useful ambient temperature inactivity and for storage stability. For example, a tributyltin alkoxide of poly(styrene-allyl alcohol), Catalyst B, had shown a substantial catalytic activity at ambient temperature when premixed for 24 hours with a hydroxyl-terminated polyester (Diorez 520) the ($t_{80}$ being 20.5 minutes. To demonstrate the difference of behaviour with Catalyst F two cures were monitored, both with a formulation as follows: hydroxyl terminated polyester (Diorez 520), 100; Polymeric MDI (Hyperlast 2875/000) 15.4; Catalyst F 2.5. In one case the components were mixed together at substantially the same time, whilst in the second case the Diorez and catalyst were premixed and stored for 16 hours before the addition of the isocyanate. Both showed similar curing activity, $t_{80}$ being approximately 8 hours. The ability to premix and store for at least a working shift is particularly beneficial.

EXAMPLE 6

A glassy solid similar to Catalyst B (Example 1) but containing 17.2% Sn (1.09) was coated onto a precipitated calcium carbonate (Calofort U) (20 g) from a solution in dichloromethane. A white powder (Catalyst G) containing 1.6% Sn was obtained.

Figure 5:
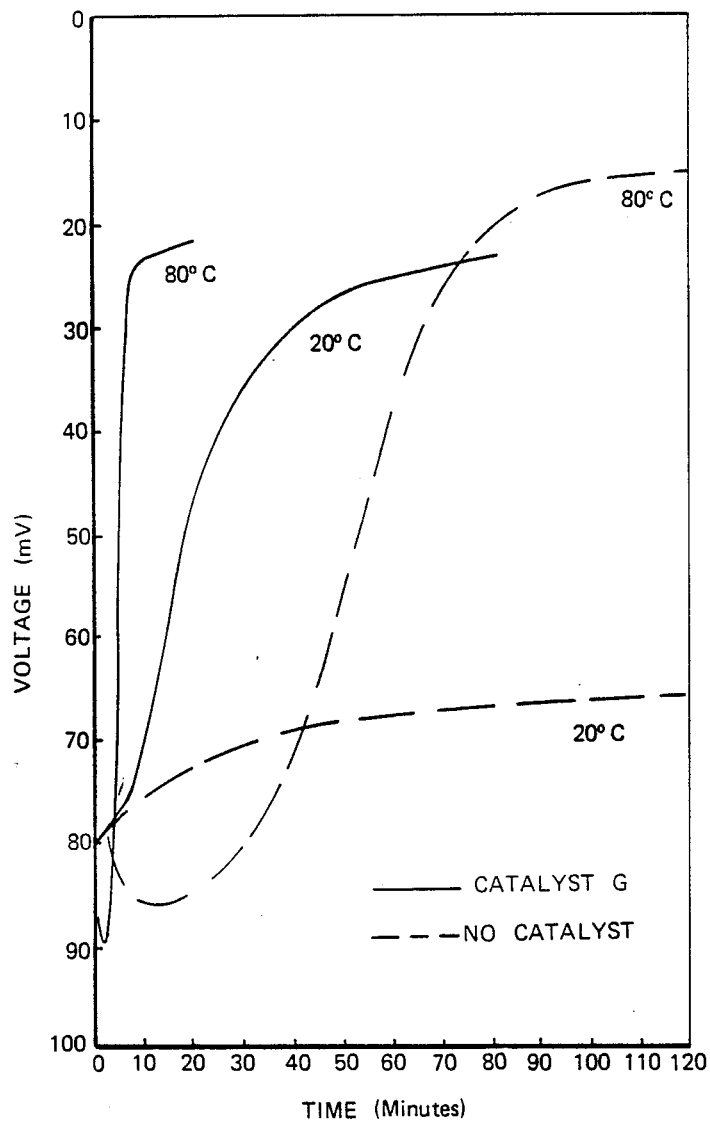

An hydroxyl-terminated polyester Diorez 520 has been cured with a polymeric MDI (Hyperlast 000) in the presence and absence of Catalyst G at room temperature and 80° C. Table 6 describes these cures and FIG. 5 presents the VNC traces for the cures. Containing the catalyst on a high surface area substrate provides scope for more effective utilisation of catalyst groupings as can be seen by comparing these VNC traces with those given in FIG. 1 for Catalyst B. The content of tin is similar in both the coated and uncoated systems, but the catalyst coated on the precipitated filler gives an ambient temperature cure in minutes, much faster than with the uncoated catalyst.

TABLE 6

Polyurethane Formulation Containing Catalyst G

| Code | % Sn. | Temperature | Diorez 520 | Hyperlast 000 | Catalyst G |
|---|---|---|---|---|---|
| SP1889 | 0.13% | 20° C. | 100 parts | 15.4 parts | 10 parts |
| SP1887 | 0.10% | 80° C. | 100 parts | 15.4 parts | 10 parts |
| SP1898 | — | 20° C. | 100 parts | 15.4 parts | — |

TABLE 6-continued

Polyurethane Formulation Containing Catalyst G

| Code | % Sn. | Temperature | Diorez 520 | Hyperlast 000 | Catalyst G |
|------|-------|-------------|------------|---------------|------------|
| SP1350 | — | 80° C. | 100 parts | 15.4 parts | — |

EXAMPLE 7

A terpolymer of butyl methacrylate, methyl methacrylate and acrylic acid (2.0 g; 4.7 meq (COOH) was dissolved in 1-methoxy propan-2-ol, and dibutyltin diacetate (0.82 g; 2.3 mmol) was added to the solution. A film of this solution was spread onto a sheet of polyethylene terephthalate film (Melinex) and the solvent was allowed to evaporate off leaving a thin, dry coating of catalyst on the film. This coating, designated Catalyst H, was placed in an oven at 80° C. to remove by-product acetic acid from it, completing the conversion to the polymer-supported salt.

A P.U. formulation containing no catalyst was prepared in the proportions hydroxyl-terminated polyester (Diorez 520) 10.0g; polymeric MDI (Hyperlast 000) 1.54 g. This was spread in thin films on polyethylene terephthalate (Melinex) sheet treated with Catalyst H, and on some untreated Melinex sheet. Both sheets were then placed in an 80° C. oven and the gel time of the P.U. formulation observed. It was found that the formulation spread on the treated Melinex sheet gelled in 30 minutes. Two similar formulations were cured at room temperature, both remained ungelled 3 hours after spreading on treated and untreated Melinex sheet.

EXAMPLE 8

An acrylic copolymer prepared from methyl methacrylate (90 parts) and methacrylic acid (10 parts) (9.8 g; 11.4 meg. COOH) was dissolved in a mixture of 1-methoxypropon-2-ol and toluene and cobalt (II) acetate (1.42 g; 5.7 mmole) was added. A portion of chopped glass fibre mat was soaked in the clear purple solution obtained and, after excess solution was drained off, the solvent was then allowed to evaporate off at room temperature. The treated mat was then heated at 120° C. under reduced pressure to remove the final traces of solvent and drive off the acetic acid to complete the reaction between the acrylic polymer and cobalt(II) acetate. This acrylic coating was designated Catalyst I. A commercial unsaturated polyester obtained as a 61% solution in styrene (100 parts) was blended with t-butyl hydroperoxide (5 parts). A sample of the treated glass fibre mat described above (Sample A) and a piece of untreated glass fibre mat (Sample B) were impregnated with the hydroperoxide/resin blend. After more than 1 hour at room temperature neither sample showed any signs of curing. They were then placed in an oven at 110° C. Sample A curing to a hard composite after only 7 minutes and Sample B requiring 30 minutes to achieve a similar extent of cure. The original resin blend was still workable 4 hours after mixing.

EXAMPLE 9

A terpolymer of butyl methacrylate, methyl methacrylate and methacrylic acid (88.53 g; 188 meq COOH) was reacted with dibutyltin acetate (3293 g; 94 mmol) to form a glassy organotin catalyst. The glassy catalyst was ground up to give a free flowing powder, designated Catalyst J.

Table 7 records the time taken by a cure of a silanol terminated silicone polymer of molecular weight 60,000 (100 parts) with tetraethoxy silane (10 parts), to reach 80% cure ($t_{80}$) as measured by the VNC in the presence of either dibutyltin dilaurate (1 part) or Catalyst J (5 parts) or in the absence of catalyst, at various temperatures.

TABLE 7

Cure of a Silicone Polymer in the Presence of Various Catalysts

| Catalyst | Temperature | $t_{80}$ |
|----------|-------------|----------|
| DBTL | 100° C. | 37 minutes |
| Catalyst J | 100° C. | 14.5 hours |
| None | 100° C. | No response from VNC after 70 hours |
| DBTL | 25° C. | 37 minutes |
| Catalyst J | 25° C. | No apparent cure after 24 hours. |

In this cure Catalyst J shows no activity at room temperature, no apparent change occurring in the formulation over a period of 24 hours.

At 100° C. $t_{80}$ was 14.5 hours in the presence of Catalyst J, with no apparent cure occurring at 100° C. in the absence of catalyst. Thus at ambient temperatures Catalyst J shows no catalytic activity, in this type of cure, however, at 100° C. the catalyst becomes active. Dibutyltin dilaurate appears to show the same activity at both ambient temperatures and at 100° C.

We claim:

1. A temperature-activated catalyst for curing a polyurethane or liquid polymer, comprising a polymeric support which is glassy at ambient temperature and insoluble in the phase of the polymer being cured, and which has bound thereto a compound for catalyzing the curing of said polymer, the activity of said catalyst being a function of the glass transition temperature of the support.

2. A temperature-activated catalyst as recited in claim 1, wherein said support has a $T_g$ of about 30° to 60° C.

3. A process for preparation of a temperature-activated catalyst for curing a polyurethane or liquid polymer, comprising mixing a compound which catalyzes said curing with a polymeric support which is glassy at ambient temperature and insoluble in the phase of the polymer being cured, said compound becoming bound to said support to form the catalyst.

4. A process for the preparation of a temperature-activated catalyst as recited in claim 3, wherein the support is in solution when mixed with the compound.

5. A process for the preparation of a temperature-activated catalyst according to claim 3, additionally comprising grinding the catalyst into a fine powder.

6. A temperature-activated catalyst as recited in claim 1, wherein the catalyst-supporting polymer is mobile or rubbery.

7. A temperature-activated catalyst as recited in claim 1, wherein the catalyst contains organotin groupings bound to a linear polymer backbone.

8. A temperature-activated catalyst as recited in claim 7, in which the compound is selected from the group consisting of bis(triphenyltin) oxide and bis (tributyltin) oxide, and the support is poly(styrene-allyl alcohol).

9. A temperature-activated catalyst as recited in claim 1, which is ground to a fine powder.

10. A temperature-activated catalyst as recited in claim 1, wherein the catalyst comprises a cross-linked glassy polymer support containing tributyltin alkoxide groups.

11. A temperature-activated catalyst as recited in claim 1, in which the catalyst comprises a glassy polymer support containing an organotin carboxylate.

12. A temperature-activated catalyst as recited in claim 1, additionally including a plasticiser.

13. A temperature-activated catalyst as recited in claim 1 which is coated onto a substrate.

14. A temperature-activated catalyst as recited in claim 13, wherein the substrate is an inert phase selected from the group consisting of a mineral powder and glass.

15. A temperature-activated catalyst as recited in claim 13, wherein the substrate is selected from the group consisting of a component of a laminate and a composite.

16. A temperature-activated catalyst as recited in claim 15, wherein the substrate is an organic polymer.

17. A process for the preparation of a temperature activated catalyst as recited in claim 3, wherein the catalytic polymer is glassy at ambient temperature and can be ground into a fine powder.

18. A process for the preparation of a temperature activated catalyst as recited in claim 3, wherein the polymeric support is linear.

19. A process for the preparation of a temperature activated catalyst as recited in claim 3, wherein the polymeric support is cross-linked.

* * * * *